United States Patent

Isozaki et al.

[11] Patent Number: 5,306,549
[45] Date of Patent: Apr. 26, 1994

[54] BIAXIALLY STRETCHED POLYETHYLENE FILM

[75] Inventors: Hideo Isozaki, Yatsushiro; Makoto Hirata, Sentyo; Masumi Takahashi, Matsudo, all of Japan

[73] Assignee: Kohjin Co., Ltd., Tokyo, Japan

[21] Appl. No.: 667,392

[22] PCT Filed: Oct. 9, 1990

[86] PCT No.: PCT/JP90/01307
§ 371 Date: Mar. 27, 1991
§ 102(e) Date: Mar. 27, 1991

[87] PCT Pub. No.: WO91/05004
PCT Pub. Date: Apr. 18, 1991

Related U.S. Application Data

[63] Continuation-in-part of Ser. No. 393,943, Aug. 15, 1989, Pat. No. 5,132,074.

[30] Foreign Application Priority Data

Apr. 10, 1989 [JP] Japan .................................. 1-87869
Oct. 9, 1989 [JP] Japan .................................. 1-261973

[51] Int. Cl.⁵ .............................................. B32B 27/08
[52] U.S. Cl. ...................................... 428/220; 428/516; 428/910
[58] Field of Search ................. 264/564; 428/910, 516, 428/220

[56] References Cited

U.S. PATENT DOCUMENTS 4,801,652  1/1989  Mizutani et al. ................... 525/240
4,837,262  6/1989  Jeon et al. .......................... 524/322

FOREIGN PATENT DOCUMENTS 64-14018  1/1989  Japan .
64-22548  1/1989  Japan .
1-131210  5/1989  Japan .

Primary Examiner—Edith Buffalow
Attorney, Agent, or Firm—Armstrong, Westerman, Hattori, McLeland & Naughton

[57] ABSTRACT

The present invention relates to a biaxially stretched film whose main component is a linear low density polyethylene showing, in measurement of a melting point by a differential scanning calorimeter, a main peak temperature (Tma) within the range of 118°±5° C. in a melting curve obtained when after a temperature of the polyethylene is kept at 190° C. for 30 minutes, the temperature is dropped down to 20° C. at a cooling rate of 100° C./minute and subsequently raised at a heating rate of 10° C./minute (hereinafter referred to as "melting curve after rapidly cooling") and showing a temperature difference between Tma and Tmb of at least 3° C. wherein Tmb is a main peak temperature in a melting curve obtained when after the temperature of the polyethylene is kept at 190° C. for 30 minutes, the temperature is dropped down to 20° C. at a cooling rate of 10° C./minute and subsequently raised at a heating rate of 10° C./minute (hereinafter referred to as "melting curve after gradually cooling") (hereinafter referred to as "lowered melting point polyethylene in rapidly cooling"). Since this film is excellent in stability on stretching, the stretching can be stably conducted by a low tensile strength upon stretching, as a result a stretched film having excellent stretchability and shrinkability, and having excellent elastic restoration can be obtained.

11 Claims, 1 Drawing Sheet

FIG.1

BIAXIALLY STRETCHED POLYETHYLENE FILM

This application is a continuation-in-part of prior application Ser. No. 393,943 filed Aug. 15, 1989, now U.S. Pat. No. 5,132,074.

DESCRIPTION

1. Technical Field

The present invention relates to packaging materials. More particularly, the present invention relates to a polyethylene film for packaging prepared from a specific ethylene copolymer as a main component, which has a little variation in thickness, and a single layer or multi-layer biaxially stretched polyethylene film which is caused oriented by stretching under specific conditions, which is excellent in stretchability, shrinkability and restoration from deformation; and a preparation process thereof.

2. Background Art

As a conventional heat shrinkable polyethylene film, there have been known films prepared by tubular biaxial stretching and applicable to shrink packaging at a low temperature lower than a melting point, which have been found out by the present inventors, and put on the market.

Further, the present inventors have found out heat shrinkable polyethylene films improved in stability of a stretched tube and uniformity of stretching by specifying polyethylene copolymers (Japanese unexamined Patent Publication No. 62-201229).

On the other hand, recently, as a film for packaging foods such as meats, sea foods, vegetables, fruits and daily dishes, stretchable films have been increased with the increase of the number and expansion of the scale of supermarkets and convenience stores.

Heretofore, as a heat stretchable film, a film prepared from a plasticized polyvinyl chloride as a raw material has been most widely used, since the film has excellent properties such as excellent transparency and tackiness. The film is, however, disadvantageous in safety, health or environmental pollution. For instance, it is easy to cause the loss of weight or the deterioration of a package object to be packaged because of a large amount of steam permeating through the film, or it is easy to contaminate the a packaged object with the plasticizer which results from the use of a large amount of the plasticizer. In addition, harmful hydrogen chloride gas is generated during the production of the film, melt-cutting of the film in the packaging production process, destruction of the film by fire, and the like.

Therefore, films which can be substitued for the plasticized polyvinyl chloride film have been actively developed in an ethylene resin such as polyethylene or ethylene-vinyl acetate copolymer, a polybutadiene resin, and the like.

Although the films obtained by this invention are improved in stability of the stretched tube and uniformity of stretching and show the effect for improving the thickness variation, films having a less variation in thickness have been desired from the viewpoints of suitability for packaging machine and printability.

Although the polyethylene or polybutadiene resin films as mentioned above have no disadvantages regarding safety, health and the environmental pollution, they are not fully satisfactory as a stretchable film. For instance, a non-stretched low density polyethylene film causes a necking phenomenon where the stretched film has stretched parts and non-stretched parts. Thus the film thickness remarkably varies upon stretching for stretch packaging and the elastic restoration is small, thereby resulting in unacceptable packaged objects. Further, the film strength is poor and the transparency is unsatisfactory. So, in order to improve the strength of the film or give the heat shrinkability to the film, it has been attempted that the film be given a high orientation by biaxial stretching. However, low density polyethylene has technical difficulties such that the film is broken during the processing, therefore, its preparation method is the so-called inflation method. Thus, since the obtained film is not given effective molecular orientation, it is inadequate in strength and shows a heat shrinkability only at high temperatures close to its melting point.

Also, it has been tried to market films prepared from a crystalline 1,2-polybutadiene or ethylene-vinyl acetate copolymer as a main component, to which an antifogging agent or a tackifier are added. However, since these films are prepared by the T-die method or the inflation method, the obtained films have no heat shrinkability. When packaging an object to be packaged with these films by a hand wrapper or a stretch automatic packaging machine, it is easy to break the films at an edge of a tray due to the poor film strength. That is, these films have not yet reached to a level that they can be substituted for the conventional films.

On the other hand, objects to be packaged have been diversified. Consequently, in case of packaging objects containing a large amount of water such as pickles or foods boiled down in soy, if the sealing is due to only the tackiness of the film, the sealing joints of the film peel off due to water adhering thereto, thus resulting in the loss of weight of the object, and further lowering of its market value. Accordingly, films capable of heat sealing have been required. Also, there is a case that, depending on objects to be packaged, a tightly-fitting package cannot be obtained, if owing to only the stretchability of the film, remaining creases or looseness on the film. Accordingly, films having, in addition thereto, heat shrinkability have been required.

Also, from the viewpoints of the requirements for higher productivity and speedup of packaging, automatic packaging machines such as automatic stretch packaging machines and automatic shrink packaging machines are rapidly replacing hand wrappers and are remarkably spreading, with increase of the number and expansion of the scale of supermarkets and convenience stores. Accordingly, films applicable to automatic packaging machines are strongly required.

Further, from the standpoints of those in the wrapping art, there have been required films applicable to stretch packaging as well as shrink packaging, such that it is not required to replace by other films, even if an object to be packaged is changed, and which have heat sealability.

Further, according to the changes in distribution processing, there have been recently increasing cases where tray packaging is conducted by automatic stretch packaging machines or automatic shrink packaging machines at a place of production, corrugated cardboard boxes packed with the packaged objects are transported, and they are unpacked in supermarkets or convenience stores. Where they are displayed and sold. Due to a load of the boxes stacked on top of each other in the course of transport, the packaged objects become unattractive, for instance, the tension of the film on the tray surface disappears or the film becomes creased, thus resulting in actual facts that the packaging is conducted again in backyards of supermarkets or convenience stores. Accordingly, packaging materials such that even if the transport is conducted in the state that the boxes packed with the packaged objects, which are stacked tier and tier, the tension of the film on the tray surface does not disappear have been required.

DISCLOSURE OF THE INVENTION

In order to overcome the above-mentioned defects of the stretchable films and provide biaxially stretched films having small variation in thickness and films further having heat shrinkability and stretchability, and capable of sealing by a plate heater whereby the sealing joints do not peel off even if water adheres to the joints, the fine shrink packages can be obtained, and the re-packaging is not required because of excellent restoration even if partially stretching the shrinked parts after shrink packaging, by using polyethylene resins which are excellent in transparency, gloss, tear strength and low temperature resistance, have suitable gas permeability and low steam permeability, do not cause the loss of weight of the objects, do not cause the migration of plasticizers, and do not produce hydrogen chloride gas during burning, earnest studies have been made. As a result, it has been found that there are applicable to the objects single layer, biaxially stretched films obtained by stretching non-stretched films prepared from, as a main component, a composition containing a specific linear low density polyethylene under known conditions to cause orientation, and films obtained by stretching a non-stretched multilayer films having, as an intermediate layer, a layer of the above-mentioned composition under low tensile strength conditions to cause orientation, and the present invention have been accomplished.

That is, the present invention relates to (1) A biaxially stretched polyethylene film formed from a linear low density polyethylene (A) as mentioned below as a main component [hereinafter referred to as "biaxially stretched film (1)];

(2) a biaxially stretched polyethylene film formed from a composition containing, as main components, 100 parts by weight of the total of 90 to 60% by weight of a liner low density polyethylene (A) as mentioned below and 10 to 40% by weight of an ethylene-α-olefin copolymer (B) as mentioned below and 0.5 to 3.0 parts by weight of a surfactant composition (D) as mentioned below [hereinafter referred to as "stretchable, shrinkable film (2)"];

(3) a biaxially stretched polyethylene film wherein an intermediate layer is prepared from a composition containing as a main component a linear low density polyethylene (A) as mentioned below, the innerest layer and the outerest layer are prepared from a composition containing as main components 100 parts by weight of the total of 20 to 60% by weight of an ethylene-α-olefin copolymer (B) as mentioned below and 80 to 40% by weight of a linear low density polyethylene (C) as mentioned below and 0.5 to 3.0 parts by weight of a surfactant composition (D) as mentioned below, and the thickness of the intermediate layer accounts for at least 60% of the total thickness and each thickness of the innerest layer and the outerest layer is at least 1 μm [hereinafter referred to as "multi-layer stretchable, shrinkable film (3)"];
and their preparation methods.

(A) a linear low density polyethylene having a density of 0.870 to 0.930 g/cm$^3$ and a melt flow index of 0.1 to 10 g/10 minutes, and showing, in measurement of melting point by the differential scanning calorimeter, a main peak temperature (Tma) within the range of 118°±5° C. in a melting curve obtained when after a temperature of the polyethylene is kept at 190° C. for 30 minutes, the temperature is dropped down to 20° C. at a cooling rate of 100° C./minute and subsequently raised at a heating rate of 10° C./minute (hereinafter referred to as "melting curve after rapidly cooling") and showing a temperature difference between Tma and Tmb of at least 3° C. wherein Tmb is a main peak temperature in a melting curve obtained when after the temperature of the polyethylene is kept at 190° C. for 30 minutes, the temperature is dropped down to 20° C. at a cooling rate of 10° C/minute and subsequently raised at a heating rate of 10° C./minute (hereinafter referred to as "melting curve after gradually cooling") (hereinafter referred to as "lowered melting point polyethylene in rapidly cooling")

(B) an ethylene-α-olefin copolymer having a density of 0.870 to 0.900 g/cm$^3$, a melt index of 0.1 to 20 g/10 minutes and a melting point according to DSC of 50° to 100° C. (hereinafter referred to as "low melting point polyethylene copolymer")

(C) a linear low density polyethylene having a density of 0.890 to 0.930 g/cm$^3$ and a melt flow index of 0.1 to 10 g/10 minutes (hereinafter referred to as "widely used linear low density polyethylene")

(D) a composition comprising at least one surfactant selected from the group consisting of glycerol fatty acid esters, polyglycerol fatty acid esters, sorbitan fatty acid esters, polyethylene glycol fatty acid esters, alkyl diethanol amides, polyoxyethylene alkyl amines and polyoxyethylene alkyl ethers (hereinafter referred to as "surfactant composition")

In an aluminum pan is sealed 8 to 10 mg of a sample, and measurement by DSC is conducted in a nitrogen stream.

The lowered melting point polyethylene in rapidly cooling (A) used as the main component resin in each of the biaxially stretched film (1), the stretchable, shrinkable film (2) and the intermediate layer of the multi-layer stretchable, shrinkable film (3) can be selected from among, for instance, copolymers of ethylene and one or more α-olefins having 3 to 20, preferably from 3 to 12, carbon atoms including propylene, butene-1, hexene-1,4-methyl pentene-1, octene-1, decene-1 and dodecene-1. More concretely, there are particularly preferable, for instance, terpolymers containing at least 50% by weight of ethylene and two kinds of the α-olefins as main components and having a total branching coefficient of not less than 1.5 CH$_3$/100° C., and copolymers containing ethylene and the α-olefin having 4 to 8 carbon atoms as main components and having a branching coefficient of not less than 2.5 CH$_3$/100° C. Especially, the copolymer of ethylene and butene-1, and terpolymer of ethylene, 4-methyl pentene-1 and butene-1 and terpolymer of ethylene, octene and butene-1 are more preferable.

Films prepared from polyethylenes indicating a melting curve after rapidly cooling in which an endothermic area within the range of Tma ±5° C. accounts for not less than 15% of the total endothermic area are particularly excellent in stability during stretching.

The above-mentioned lowered melting point in rapidly cooling polyethylene (A) may be used alone or as a mixture thereof. Also, a polyolefin resin such as a high pressure method polyethylene, an ethylene-vinyl acetate copolymer, an ionomer or an ethylene-propylene copolymer may be admixed with the above-mentioned resin which is used as the main component within the range such that its use do not interfere with the attainment of the objects of the present invention.

As the above-mentioned resin (A), the lowered melting point polyethylene in rapidly cooling, those having a density of 0.890 to 0.930 g/cm$^3$, preferably form 0.900 to 0.920 g/cm$^3$, are used, and those having a melt flow index of 0.1 to 10 g/10 minutes, preferably from 0.3 to 5 g/10 minutes, are used. When the density is less than 0.890 g/cm$^3$, though the stretchability and heat sealability at low temperature are excellent, there are defects that the strength of the film becomes poor and the heat shrinkability is so large that the shrinkage is caused when sealing by using a plate heater of the automatic packaging machine, therefore the finish of the tray bottom becomes bad. When the density is more than 0.930 g/cm$^3$, the stretchability becomes poor and the heat sealability becomes low, so the films desired by the present invention cannot be obtained. Also, the case where the melt index is less than 0.1 g/10 minutes is not preferably from the viewpoints of lowering the processability and the stretchability, and the case where the melt index is more than 10 g/10 minutes is not preferable since the processability at stretching becomes bad.

Also, polyethylenes showing the above-mentioned Tma-Tmb of less than 3° C. are not preferable since the stability and uniformity of the stretching are insufficient when forming the film from such a polyethylene together with the low melting point polyethylene and the surfactant composition and stretching the film, so the films desired by the present invention cannot be obtained.

The lowered melting point polyethylenes in rapidly cooling (A) are used as the main component, and may contain other ethylene copolymer within the range of not more than 20% by weight. As such ethylene copolymers which may be added, there are exemplified, for instance, widely used linear low density polyethylene resins, low melting point ethylene-α-olefin copolymers as mentioned below, high pressure method polyethylenes, copolymers of ethylene and polypropylene, ionomers, ethylene-vinyl acetate copolymers, copolymers of ethylene and (meth)acrylic acid, and the like. When the amount of the above-mentioned other ethylene copolymer is more than 20% by weight, the characteristic of the present invention, the stretching stability on stretching under low tensile strength becomes unsatisfactory, so the objects of the present invention cannot be attained.

The above-mentioned low melting point polyethylene copolymers (B) can be selected from among, for instance, copolymers of ethylene and propylene, butene-1, pentene-1, hexene-1, 4-methyl pentene-1, octene-1, decene-1 or a mixture thereof. Particularly, the copolymers selected from the copolymers of ethylene and butene-1 are preferably used. Copolymers having a density of less than 0.870 g/cm$^3$ are effective as to improvement of low temperature heat sealability, but it is easy to cause the blocking of films even if adding the surfactant composition to such a copolymer, and the roll-releasability of film is poor. Also, such a copolymer has a defect that the slipping property in automatic packaging machines is bad. Copolymers having a density of more than 0.90 g/cm$^3$ are not preferably because of a little effect for improving the sealability at low temperature. Copolymers having a melt flow index of less than 0.1 g/10 minutes are not preferable because of the lowering of processability and the lowering of stretchability, like the case of the linear low density polyethylene. Copolymers having a melt flow index of more than 20 g/10 minutes have such a problem that the stability of the stretched tube is bad. The amount of the low melting temperature polyethylene copolymer to be added in the preparation of the stretchable, shrinkable film (2) is from 10 to 40% by weight. When the amount is less than 10% by weight, the heat sealability at low temperature is not improved and the stretchability is poor in some degree. On the other hand, when the amount is more than 40% by weight, the heat sealability at low temperature is excellent, but a performance simultaneously satisfying the roll-releasability on drawing out from the film roll, the slipping property in the automatic packaging machine and the tackiness between films cannot be obtained even in a case of adding the surfactant composition as mentioned below. The amount range is preferably from 20 to 35% by weight.

The admixing ratio of the low melting point polyethylene copolymer (B) in the innermost and the outermost layers of the multi-layer stretchable, shrinkable film (3) is from 20 to 60% by weight. When the ratio is less than 20% by weight, the sealability at low temperature is poor and the sealability by a plate heater of an automatic packaging machine is poor in a tray bottom part. Also, particularly, the collapsing property of films is bad in a tube forming step and a collapsing step. On the other hand, when it is more than 60 parts by weight, the heat sealability at low temperature and the stretchability are excellent, but the performance simultaneously satisfying the roll-releasability on drawing out from the film roll, the slipping property in automatic packaging machines and the tackiness between the films cannot be obtained even in a case of adding the surfactant composition as mentioned below.

As the above-mentioned widely used linear low density polyethylenes (C), there are exemplified, for instance, copolymers of ethylene and one or more α-olefins having 3 to 20, preferably 4 to 8, carbon atoms such as propylene, butene-1, hexene-1, 4-methyl pentene-1, octene-1, decene-1 and dodecene-1, and the like.

As the above-mentioned surfactant composition (D), one or more nonionic surfactants such as glycerol fatty acid esters, polyglycerol fatty acid esters, sorbitan fatty acid esters, polyethylene glycol fatty acid esters, alkyl diethanol amides, polyoxyethylene alkyl amines and polyoxyethylene alkyl ethers are used.

It is necessary that the surfactant composition is used within the range of the above-mentioned added amount, because it is related to the releasability of film from the roll, the slipping property in automatic packaging machines, the tackiness between the films and the heat sealability in combination with the resin composition, in addition that the surfactant composition gives the antifogging property. From the viewpoint of exhibiting the above-mentioned properties, there are more preferable as the surfactant the polyglycerol fatty acid esters, the sorbitan fatty acid esters, the polyethylene glycol fatty acid esters and the alkyl diethanol amines.

As the component used in the above-mentioned surfactant composition, concretely, there are exemplified glycerol monolaurate, glycerol monostearate, glycerol monooleate, diglycerol monolaurate, diglycerol monostearate, diglycerol monooleate, sorbitan monolaurate, sorbitane monostearate, sorbitane monooleate, polyoxyethylene glycerol monolaurate, polyoxyethylene glycerol monostearate, polyoxyethylene glycerol monooleate, polyethylene glycol monolaurate, polyethylene glycol monopalmitate, polyethylene glycol monostearate, polyethylene glycol monooleate, polyethylene glycol dioleate, polyethylene glycol trioleate, lauryl diethanolamide, stearyl diethanolamide, oleyl diethanolamide, polyoxyethylene lauryl amine, polyoxyethylene stearyl amine, polyoxyethylene oleyl amine, polyoxyethylene lauryl ether, polyoxyethylene stearyl ether, polyoxyethylene oleyl ether, and the like.

When the added amount of the surfactant (D) in the above-mentioned stretchable, shrinkable film (2) and the innerest and the outerest layers of the multi-layer stretchable, shrinkable film (3) is less than 0.5 part by weight, there are defects such that the antifogging property is unsatisfactory, the slipping property in automatic packaging machines is bad, and the collapsing of the film in tray-packaging is inadequate so, the figure of finished package in the tray bottom part is bad. When the amount is more than 3 parts by weight, though the antifogging property, the slipping property in automatic packaging machines and the collapsing property of the film in tray packaging are excellent, the heat sealability is lowered and the sealing of the film at the bottom part is inadequate, which are not preferable.

In addition to each component as mentioned above, additives usually used such as a lubricant, an antiblocking agent and an antistatic agent may be suitably used for providing each useful function.

Also, as to the above-mentioned multi-layer stretchable, shrinkable film (3), when the thickness of the intermediate layer accounts for less than 60% of the total thickness, the stability of the bubble on stretching is poor. On the other hand, when each thickness of the innerest layer and the outerest layer after stretching is less than 1 μm, the heat sealability cannot be exhibited, and in the both cases, the objects of the present invention cannot be exhibited.

The above-mentioned multi-layer stretchable, shrinkable film (3) may contain one or more layers of a polyethylene resin between the intermediate layer and the innerest layer or the outerest layer so long as the thickness limitations concerning each layer, that is, the conditions that the thickness of the intermediate layer accounts for at least 60% of the total thickness and each thickness after stretching of the innerest layer and the outerest layer is at least 1 μm. As the polyethylene resin capable of forming into such layers, there are exemplified, for instance, widely used linear low density polyethylenes, low melting temperature ethylene-α-olefin copolymers as mentioned below, high pressure method polyethylenes, copolymers of ethylene and propylene, ionomers, ethylene-vinyl acetate copolymers, copolymers of ethylene and (meth)acrylic acid, and the like.

In addition to each constituting element as mentioned above, additives such as a lubricant, an agent for preventing blocking, an antistatic agent and an antifogging agent are suitably used in the biaxially stretched film (1), the stretchable, schrinkable film (2) and each layer of the multi-layer stretchable, shrinkable film (3), for providing each usual function.

Next, the preparation processes of the films of the present invention are explained.

As processes for preparing the biaxially stretched films (1), (2) and (3), films can be obtained in a way wherein, using a known apparatus, the resins according to the resin composition and the layer structure corresponding to each film are melted by heating, kneaded and extruded into a single layer or a multi-layer, which is then solidified by rapidly cooling to give a non-stretched film, and subsequently in the case of the film (1), the film is stretched under known conditions, or in the case of the stretched films (2) and (3), the film is stretched under a condition such that a tensile strength on stretching is $30 \leq S \leq 170$ kg/cm$^2$. The processes are concretely explained as follows, exemplifying the case of forming a tubular film and stretching. Preparation process of a non-stretched film In the case of the biaxially stretched film (1) and the stretchable, shrinkable film (2), the resins corresponding to each film structure are melted by heating and kneaded in an extruder, and is extruded into a tube from a circular die, which is then solidified by rapidly cooling in the same manner as in the conventional manner to give a non-stretched film.

Figure 1:
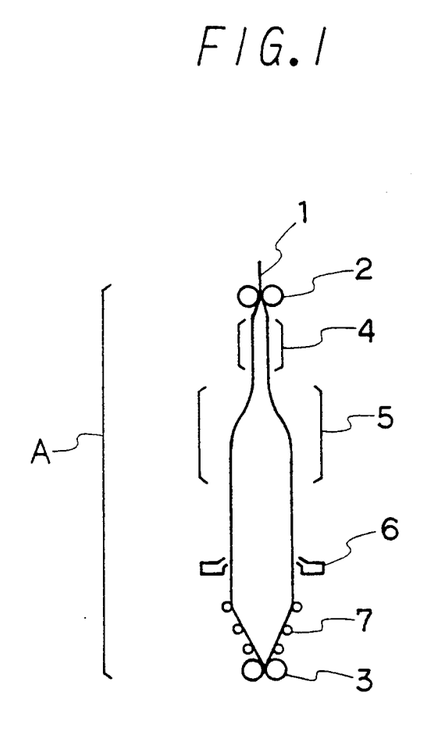
FIG. 1 is a schematic diagram showing a biaxially stretching apparatus used in the Examples of the present invention.

In case of the multi-layer stretchable, shrinkable film (3), the resin compositions having the specific ranges, corresponding to each layer, are melted by heating and kneaded in three extruders, and are coextruded into a tube from a three-layer circular die, and then solidified by rapidly cooling without stretching to give a non-stretched film. Stretching processing The biaxially stretched film (1) can be stretched under usual conditions. More concretely, for instance, the tubular non-stretched film thus obtained is fed to a tubular stretching equipment as shown in FIG. 1, by which it is expanded and stretched and, at the same time, biaxially oriented by applying a gas pressure to the inside of the tube in a temperature region where an effectively high degree of orientation is induced, for example, at a temperature below a temperature lower than the melting point of the resin by 10° C., preferably a temperature lower than the melting point by 15° C. The stretching ratio may not be the same for both machine and transverse directions. In order to assure excellent physical characteristics such as strength and shrinkage, the stretching ratio is at least 2 times, preferably at least 2.5 times, more preferably at least 3 times in both the machine and the transverse directions.

The film taken out from the stretching equipment may be annealed as occasion demands, in the case of utilizing as the heat shrinkable film, by which films having small spontaneous shrinkage during storage can be obtained. As to the use that the shrinkability is not required, the film is completely solidified by heating in a usual manner.

In case of the stretchable, shrinkable film (2) and the multi-layer strechable film (3), it is necessary that the streching is conducted under the condition satisfying the tensile strength on stretching showing the equation (I):

$$\text{Equation (I): } S = \frac{pd}{2t}$$

wherein p is an internal pressure of a bubble (kg/cm$^2$), d is an inside diameter of a bubble (cm) and t is a film thickness (cm).

As a more concrete process, the non-stretched film obtained as above, for instance, the obtained non-stretched tubular film is fed to a tubular stretching apparatus such as shown in FIG. 1, and it is necessary that it is adjusted to a temperature region where a high orientation is induced, in other words, adjusted to streching conditions that (1) the film surface temperature at a starting point of expansion being within the range of 15° to 35° C. below the melting temperature of the main raw material resin (in case of the multi-layer, the main raw material resin of the intermediate layer), (2) the film in a stretching zone extending from the starting point to a finishing point of expansion having a temperature gradient such that the film surface temperature at a position of ¼ to ⅓ the length of the stretching zone from the starting point is maximum, and the difference between the maximum film temperature and the film temperature at the starting point of expansion being not more than 10° C., (3) the temperature drop of the film from the maximum temperature position to the finishing point of expansion being within the range of 15° to 20° C., and (4) the film being cooled so that the film surface temperature drops 30° to 50° C. from the film surface temperature at the finishing point of expansion while traveling from 1.0 to 1.5 times the vertical distance of the stretching zone, it is necessary that the tensile strength is controlled so as to be $30 \leq S \leq 170$ kg/cm$^2$.

When the tensile strength S is less than 30 kg/cm$^2$, the obtained film has an elastic restoration of less than 90%, and is poor in restoration after shrink packaging, which is the feature of the present invention, as well as is poor in stability of the stretched bubble. On the other hand, when the tensile strength S is more than 170 kg/cm$^2$, though the obtained film is excellent in heat shrinkability, it is large in tensile stress when, for instance, 50%-elongating, thus resulting in small elongation and poor stretchability. Therefore, such a film is not suitable for the present invention whose object is to provide the film having shrinkability as well as stretchability.

The stretching ratio may not be the same for both machine and transverse directions but preferably in order to obtain an excellent physical property balance such as excellent strength.

It is preferable that the stretching ratio as the area ratio is from 8 to 25.

The film stretched and taken out from the stretching equipment, as mentioned above, may be annealed if necessary.

Among the films prepared as above, the biaxially stretched film (1) is a uniform film having a little variation in thickness, and each the stretchable and shrinkable film (2) and the multi-layer stretchable and shrinkable film (3) has a thickness variation of less than 8%, i.e., is uniform in thickness, has a tensile stress at 50%-elongation of not more than 500 kg/cm$^2$, i.e., is excellent in stretchability, has an area shrinkage at 90° C. of not less than 20%, i.e., has satisfactory performances as the shrinkable film. Furthermore, they have an elastic restoration after one minute from 30%-elongation of the film heat-shrinked so as to get an area shrinkage of 15% at 90° C. of not less than 90%, and it is easy to restore a mark formed by pushing to the original state, that is, they are excellent biaxially stretched films.

BEST MODE FOR CARRYING OUT THE INVENTION

The present invention is more specifically explained by means of the following Examples. The present invention is not limited to the Examples.

The measurements of the physical properties shown in Examples were as follows:

(1) Area shrinkage: In case of the film (1)

A square film, 10 cm by 10 cm, is cut, dipped in a glycerol bath having a temperature of 90° C. for 10 seconds, is taken out from the bath and is rapidly cooled in water. The lengths (in cm) in the machine and transverse directions are measured, and the area shrinkage is calculated by means of the following equation.

$$\text{Area shrinkage} = 100 - A \times B$$

wherein A and B represent lengths (in cm) in the machine and transverse directions, respectively, after rapidly cooling.

(2) Heat shrinkage at 90° C.

A square film, 10 cm by 10 cm, is cut and covered with a talc powder, which is allowed to stand in an oven maintained at a temperature of 90° C. for 15 minutes. The film is taken out and is rapidly cooled. The lengths in the machine and transverse directions are measured and the heat shrinkage is calculated by means of the following equation:

$$\text{Heat shrinkage at 90° C.} = 100 - A \times B \ (\%)$$

where A and B represent the lengths (in cm) in the machine and transverse directions, respectively, after rapidly cooling.

(3) Thickness variation

Using a continuously contact type electronic micrometer (made by Anritsu Denki Kabushiki Kaisha, K 306 C Type), a chart is obtained by measuring in circumferential direction of a tube in a full-scale of 8 μm. From the chart, the maximum (Tmax), the minimum (Tmin) and the average (T) are determined and the thickness variation is calculated by the following equation:

$$\text{Thickness variation} = \frac{Tmax - Tmin}{T} \times 100$$

wherein T is an arithmetical average of values read from the charts corresponding to 10 mm intervals of the measured film.

(4) Elastic restoration after 15%-shrinkage

The film is put in a wooden frame in a uniformly loose state so as to become the film's area shrinkage of 15%, which is heat-treated in an oven having a temperature of 90° C. until the looseness on the film disappears to take out it from the oven.

Specimens are cut out parallel to MD and TD of the film in a width of 15 mm and a length of 200 mm, respectively and two lines are marked on the each specimen with the space of 100 mm. The specimen is attached to a tensile tester (space between chucks of 150 mm) so that the two marked lines are set between the chucks, and is elongated by 30% at a tensile rate of 200 mm/min. and returned to the original length at the same tensile rate as above. The film is taken off from the tester and is allowed to stand for 1 minute. The length between the two marked lines is measured, and the restoration of the film is calculated according to the following equation:

$$\frac{\text{Elastic restoration}}{\text{after 15\%-shrinkage}} = \frac{130 - C}{30} \times 100(\%)$$

wherein C is a length between the two marked lines (mm) in the machine and transverse directions, respectively, after 1 minute.

(5) Figure of finished package

Two oranges having a diameter of about 5 cm are put on a tray made of a foamed polystyrene, having a width of 105 mm, a length of 195 mm and a depth of 20 mm and a packaging test is conducted by using a commercially available automatic packaging machine provided with a plate heater for sealing and a tunnel for shrinking. The results of the test are estimated according to the following criteria:
○: There is no trouble in the automatic packaging machine and the fine, tightly-fitted package can be obtained without creases and looseness on the film.
Δ: Although there is no trouble in the automatic packaging machine, the obtained packaged object has partial creases or looseness on the film.
X: There is trouble in the automatic packaging machine such that it is difficult to release the film from a film-roll, or though there is no trouble in the machine, the sealing joint of the obtained packaged is bad or the packaged object has whole creases or looseness on the film.

(6) Heat sealability

In the above packaging test (5), the film is sealed with the plate heater having a temperature of 90° C. The adhesiveness of the seal portion is
○: The seal portion sufficiently melt-adheres so that if the portion is drawn apart by force, it is broken.
X: Parts remain which can peel off without breaking on the seal portion.

(7) Restoration after packaging

A tray with a depth of 12 mm having no contents is packaged by using the same automatic packaging machine as used in (5) under the same conditions as in test (3). The center part of the film of the packaged object is pushed with a finger until the finger touches the bottom of the tray and then the finger is released from the film. The time required for the film to return to the former state is measured. The estimations are as follows:
○: Within 10 seconds
Δ: Within 1 minute
X: The finger mark remains on the film for more than 1 minute, or the film cannot be returned to its former state.

(8) Antifogging property

After 50 ml of water having a temperature of 60° C. is poured into a 100 ml beaker, the opening of the beaker is covered with the film in the state of no creases. The beaker is allowed to stand in a refrigerator having a temperature of 5° C. for 1 hour, and the film is observed.
○: Not entirely clouded.
Δ: Although water droplets adhere partly to the film, the inside of the beaker can be seen through the film.
X: The film is clouded on the whole and the inside of the beaker cannot be seen through the film.

(9) Thickness of each layer

As to the thickness of each layer of the multi-layer film, the cross section of the film is observed by a microscope and it is read therefrom.

EXAMPLE 1

A linear low density polyethylene resin composed of a terpolymer of ethylene and as comonomers 4-methyl pentene-1 and butene-1, having a total branching coefficient of 2.1, a density of 0.916 g/cm$^3$ at 25° C. and a melt index of 1.2 g/10 min, and indicating a melting point (Tmb) of the raw material resin of 124° C., a melting point (Tma) after rapidly cooling of 119° C. and an endothermic area ratio of the main peak part (Tma±5° C.) to the total endothermic area in the melting curve after rapidly cooling of 22% was melted and kneaded at 170° C. to 230° C. and the melt was extruded from a circular die maintained at 230° C. The molten tubular film thus extruded was cooled while the film was guided over the outer surface of a cylindrical mandrel for cooling through which cooling water is circulated, with the exterior surface of the film being passed through a water bath, to thereby give a tubular unstretched film with a diameter of about 75 mm and a thickness of 325 μm. This tubular unstretched film was guided to the biaxial stretching device illustrated in FIG. 1, where the film was expanded and stretched at a temperature of 95° to 105° C. in a stretching ratio of 4 in each of the machine and transverse directions to give a biaxially stretched film. The thus stretched film was treated in a tubular annealing apparatus for 10 seconds with a hot air blast at 75° C. and then cooled to room temperature. The film was collapsed and wounded up.

The stability on stretching was excellent, there were no vertical motion of the stretching point and no sway of the stretched tube. Also, a nonuniform stretching state such as necking was not observed.

The obtained stretched film had a thickness of 20.8 μm, a thickness variation of 5%, and an area shrinkage of 33% at 90° C. Also, the melting point of the raw material resin was 124° C.

A confectionary box having a width of 12 cm, a length of 18 cm and a heighth of 3 cm was packaged with this film by using a commercially available automatic packaging machine under conditions that the packaging rate was 20 pieces/min, a temperature of a tunnel for shrinking was 100° C., and the time required to pass through the tunnel for shrinking was 3 sec. There was no trouble in the automatic packaging machine and a tightly-fitted package was obtained.

EXAMPLE 2

A linear low density polyethylene resin composed of a copolymer of ethylene and as a comonomer butene-1, having a branching coefficient of 3.3, a density of 0.900 g/cm$^3$ at 25° C. and a melt index of 0.4 g/10 min., and indicating a melting point (Tmb) of the raw material resin of 123° C., a melting point (Tma) after rapidly cooling of 117° C. and an endothermic area ratio of the main peak part (Tma±5° C.) to the total endothermic area in the melting curve after rapidly cooling of 25%, was melted and kneaded at 160° to 220° C. and the melt was extruded from a circular die maintained at 220° C., in the same manner as in Example 1. The formed tube was cooled while the tube was guided over the outer surface of a cylindrical mandrel for cooling wherein cooling water is circulated, with the exterior surface of the tube being passed through a water bath, to thereby give a tubular unstretched film with a diameter of about 73 mm and a thickness of 220 μm.

This tubular unstretched film was fed to the biaxial stretching device illustrated in FIG. 1 as the material film, where the film was expanded and stretched at a temperature of 90° to 100° C. in a stretching ratio of 4.2 in the machine direction and a stretching ratio of 3.8 in the transverse direction. The thus stretched film was treated in a tubular annealing apparatus for 10 seconds with a hot air blast at 75° C. and then, cooled to room temperature. The film was collapsed and wounded up.

The stability on stretching was excellent, and there were no vertical motion of the stretching point and no sway of the stretched tube. Also, the ununiformly stretching state such as necking was not observed.

The obtained stretched film had a thickness of 15.3 μm, a thickness variation of 6%, and an area shrinkage of 48% at 90° C.

A confectionary box having a width of 12 cm, a length of 18 cm and a heighth of 3 cm was packaged with this film in the same manner as in Example 1 by using the commercially available automatic packaging machine under conditions that the packaging rate was 20 pieces/min, the temperature of the tunnel for shrinking was 100° C., and the passing time through the tunnel for shrinking was 3 seconds. There was no trouble in the automatic packaging machine and a tightly-fitted package was obtained.

EXAMPLE 3

A resin mixture of a linear low density polyethylene resin composed of a terpolymer of ethylene and as comonomers 4-methyl pentene-1 and butene-1, having a total branching coefficent of 2.1, a density of 0.916 g/cm³ at 25° C. and a melt index of 1.2 g/10 min, and indicating a melting point (Tmb) of the raw material resin of 124° C., a melting point (Tma) after rapidly cooling of 119° C. and the endothermic area ratio of the main peak part (Tma±5° C.) to the total endothermic area in the melting curve after rapidly cooling of 22% and a linear low density polyethylene composed of a copolymer of ethylene and butene-1, having a branching coefficient of 1.0, a density of 0.920 g/cm³ at 25° C. and a melt index of 1.0 g/10 min, and indicating a melting point of the raw material resin of 126° C., a melting point after rapidly cooling of 126° C. and a main peak after rapidly cooling outside the range of 118°±5° C. in a mixing ratio of 60/40 was melted, kneaded and extruded in the same manner as in Example 1 to give an unstretched film. The stretching was conducted in the same manner as in Example 1. During stretching, there were no vertical motion of the stretching point and no sway of the tube and the stability was excellent. Also, the nonuniform stretching state was not observed.

The obtained stretched film had a thickness of 21.2 μm, a thickness variation of 7%, and an area shrinkage of 28% at 90° C.

Using this film, five B5 size notes were packaged under conditions that a packaging rate was 5 pieces/min. (5 volumes/piece), a temperature of a tunnel for shrinking was 110° C., and a passing time through the tunnel for shrinking was 2.4 seconds. A fine package was obtained in spite of a short packaging time.

COMPARATIVE EXAMPLE 1

A linear low density polyethylene resin composed of a copolymer of ethylene and as a comonomer 4-methyl pentene-1, having a branching coefficient of 2.7, a density of 0.920 g/cm³ at 25° C. and a melt index of 2.0 g/10 min, and indicating a melting point (Tmb) of the raw material resin of 127° C., a melting point (Tma) after rapidly cooling of 126° C., that is, Tma being outside the range of 118°±5° C. was melted, kneaded and extruded in the same manner as in Example 1 to give an unstretched film.

The unstretched film was stretched at a stretching temperature of 100° to 105° C., then the annealing was conducted in the same manner as in Example 1, and the film was collapsed and wounded up.

During stretching, the tube swayed and the necking phenomenon was observed at the stretching part. When, in order to improve such an unstable stretching, the stretching temperature was dropped down to 95° to 100° C., the necking became severe at the stretching part, the ununiformity of stretched film became further severe. On the other hand, when, in order to prevent the necking, the stretching temperature was raised to 105° to 110°, the vertical motion and the sway on the stretched tube became severe, and the stability was poor.

The stretched film obtained under the first conditions that the stretching temperature is 100° to 105° C. had a thickness of 21.3 μm, a thickness variation of 6%, and an area shrinkage of 22% at 90° C.

The film was inferior in plateness, accordingly when the packaging was conducted in the same manner as in Example 1, the packaging could not smoothly proceed, and the film was not suitable for use in the automatic packaging.

COMPARATIVE EXAMPLE 2

A linear low density polyethylene resin composed of a copolymer of ethylene and as a comonomer octene-1, having a branching coefficient of 1.0, a density of 0.920 g/cm³ at 25° C. and a melt index of 1.0 g/10 min, and indicating a melting point (Tmb) of the raw material resin of 126° C., a melting point (Tma) after rapidly cooling of 125° C., that is, Tma being outside the range of 118±5° C. was melted, kneaded and extruded in the same manner as in Example 2 to give an unstretched film. The unstretched film was stretched at a stretching temperature of 103° to 108° C., and the annealing was conducted in the same manner as in Example 1, then was collapsed and wounded up.

During stretching, the tube greatly swayed and the necking phenomenon was remarkably caused at the stretching part. When, in order to inhibit the necking, the stretching temperature was raised to 108° to 113° C., the sway of the stretched tube was so severe that the stable state could not be obtained.

The stretched film obtained by stretching under the first conditions that the stretching temperature is 103° to 108° C. had a thickness of 15.8 μm, a thickness variation of 13%, and an area shrinkage of 24% at 90° C.

The film was inferior in plateness. When the packaging was conducted by using the shrink automatic packaging machine under the same conditions as in Example 1, the obtained package had a non-uniformity in shrinkage and a tightly-fitted package was not obtained.

EXAMPLE 4

A composition wherein 1.0 part by weight of a surfactant composition comprising polyethylene glycol oleate, oleyl diethanol amine and sorbitane trioleate was added to a composition of 70% by weight of a linear low density polyethylene having properties shown in Table 1, composed of a terpolymer of ethylene and as comonomers 4-methyl pentene-1 and butene-1 and 30% by weight of a low melting point polyethylene having properties shown in Table 1 and having a melting point of 74.1° C. was melted and kneaded at 170° to 240° C. and the melt was extruded in a downward direction from a slit of a circular die maintained at 240° C. The slit diameter of the circular die was 75 mm and the slit gap was 0.8 mm. The molten tubular film thus extruded was cooled with water while the film was guided over the outer surface of a cylindrical mandrel having an outer diameter of 66 mm as disposed just below the die and internally supplied with circulating cooling water at 20° C., with the exterior surface of the film being passed through a water bath, then cooled down at room temperature and drawn, to thereby give a tubular unstretched film with a diameter of about 65 mm and a thickness of 240 μm.

This tubular unstretched film was guided as the material film to the tubular biaxial stretching device (A) illustrated in FIG. 1, where the film was expanded and stretched. The voltage and current of the circular infrared heaters of the preheater 4 were adjusted so that the film temperature at the exit of the preheater was controlled. The eight circular infrared heaters of the main heater 5 were grouped in 4 sections and the voltage and current of each section were adjusted, whereby the film was heated. While an air stream was supplied along the tube from a downward direction of the main heater, a pressurized air was blown into the tubular film between low-speed nip rolls 2 and high-speed nip rolls 3. The pressure of the pressurized air and the relative peripheral speeds of the low-speed and high-speed and high-speed nip rolls 2 and 3 were controlled so as to effect tubular stretching in a stretching ratio of 5.0 in the machine direction and in a stretching ratio of 4.0 in the transverse direction (an area stretching ratio: 20). Also, an air pressure (inner pressure of the tube) on stretching was adjusted so as to be a tensile strength of 70 kg/cm² by controlling the voltage and current of the circular infrared heaters of the preheater and the main heater, further the air quantity and the air temperature of the cooling air ring 6.

The stability on stretching was excellent and there were no vertical motion at the stretching point and no sway on the stretched tube, and also there was not observed the ununiformly stretching state such as necking.

The obtained stretched film was excellent in transparency, stretchability and heat shrinkability, as shown in Table 1.

Using the above film, the packaging test was conducted. The film was smoothly drawn out from the roll, was not slipped off from the film clip, the film was finely collapsed on tray packaging, and the packaging was stably conducted. Also, the heat sealing by 90° C.-plate heater was smoothly conducted and the seal portion sufficiently adhered.

Further, the configuration of finished package had no crease and no looseness, and was fine. As to the restoration after packaging, the film was returned to the former state during 2 to 3 seconds without remaining the finger mark.

The raw material preparations, the stretching conditions, the film properties after stretching and the results obtained in each test are shown together in Table 1.

EXAMPLE 5

A stretched film was prepared in a similar manner as in Example 4 except that a linear low density polyethylene composed of a copolymer of ethylene and as a comonomer butene-1 was used instead of the linear low density polyethylene used in Example 4, as shown in Table 1.

The raw material preparations, the stretching conditions, the stretched film properties and the results of the physical property tests are shown together in an Example 5 column of Table 1.

COMPARATIVE EXAMPLE 3

The stretching was conducted under the same conditions as in Example 4 except that as the linear low density polyethylene, a linear low density polyethylene indicating a melting curve after rapidly cooling wherein a main peak temperature, Tma was 126° C., that is, Tma being outside the range of 118°±5° C. and indicating a temperature difference between Tma and the main peak temperature in the melting curve after gradually cooling, Tmb, Tma-Tmb of 0° C. was used. However, the stability was bad during stretching, so that it was repeated that the stretched bubble greatly swayed and came into contact with the infrared heater to blow out, thus the stretched film could not be obtained.

EXAMPLE 6 AND COMPARATIVE EXAMPLES 4 AND 5

A stretched film was prepared in the same manner as in Example 4 except that a mixing ratio of the linear low density polyethylene to the low melting point polyethylene copolymer was changed to 85/15 (Example 6), 92/8 (Comparative Example 4) or 55/45 (Comparative Example 5), the ratio being % by weight, as shown in Table 1.

As to Example 6, the behavior of stretching and the properties of the obtained stretched film were not problematic, alike Examples 4 and 5, the excellent figure of finished package and heat sealability were shown, and the restoration after packaging was excellent.

However, as to Comparatives Examples 4 and 5, though the behavior of stretching was not particularly problematic in both cases, the obtained stretched film was inferior in heat sealability at low temperature and poor in stretchability, and upon conducting the packaging test, the film was frequently slipped off from the holding clip, and even if the film was not slipped off, there was a problem that the heat sealability of the overlapping part of the film at the tray bottom was insatisfactory to peel off.

Also, though the film obtained in Comparative Example 3 was good in heat sealability at low temperature and stretchability, there were problems that the slipping property in the automatic packaging machine was bad and th figure of finished package was bad at the tray bottom.

EXAMPLE 7 AND COMPARATIVE EXAMPLE 6

A stretched film was prepared in the same manner as in Example 4 except that the surfactant composition used in Example 3 was added to 100 parts by weight of the mixture of the linear low density polyethylene and the low melting point polyethylene copolymer used in Example 4 in an amount of 2.5 parts by weight (Example 7) or 3.5 parts by weight (Comparative Example 6).

The stretched film obtained in Example 7 was excellent in stretchability, heat shrinkability, configuration of the finished package and heat sealability. Although the stretched film obtained in Comparative Example 6 was excellent in antifogging property, slipping property in automatic packaging machine and film-collapsing property on tray packaging, there was a defect that the heat sealability by the plate heater was poor, so it is easy to generate the insufficiently sealed parts of the film at the tray bottom.

EXAMPLE 8 AND COMPARATIVE EXAMPLE 7

A stretched film was prepared in the same conditions as in Example 4 except that the tensile strength on stretching as defined in Example 4 was changed to 150 kg/cm$^2$ (Example 8) or 200 kg/cm$^2$ (Comparative Example 7).

Although the stretched film obtained in Example 8 was slightly higher in tensile stress at 50%-elongation than the film obtained in Example 4, the results of the packaging test were that the film was not slipped off from the clip and the tray was not deformed, that is, the automatic packaging suitability is good, and the figure of finished package was fine. The stretched film obtained in Comparative Example 7 wherein the tensile strength on stretching was more than 170 kg/cm$^2$ was high in tensile stress on elongation of the film and was low in elongation. When the packaging test was conducted by using the automatic packaging machine with this film, there were generated troubles such that the film was slipped off from the clip and if packaging was conducted by force, deformation of the tray was caused. Also, the heat sealability was poor and the configuration of finished package was bad.

EXAMPLE 9

A composition of 90% by weight of a lowered melting point polyethylene in rapidly cooling having characteristics shown in Table 2 and 10% by weight of a low melting point polyethylene copolymer as the intermediate layer, and a composition wherein 0.25 part by weight of polyethylene glycol oleate, 0.40 part by weight of oleyl diethanol amine and 0.35 part by weight of sorbitane trioleate was added to 100 parts by weight of a composition of 50% by weight of a linear low density polyethylene composed of a terpolymer of ethylene and as comonomers 4-methyl pentene-1 and butene-1 having characteristics as shown in Table 2 and 50% by weight of a low melting point polyethylene copolymer having characteristics as shown in Table 2 were melted and kneaded at 170° to 240° C. in three extruders (for the inneerest layer, for the intermediate layer, for the outerest layer) so that from the latter composition was formed the innermost and outermost layer, and extruded in a downward direction from a slit of a three-layer circular die maintained at 240° C., controlling the output rate from each extruder according to the predetermined thickness ratio as shown in Table 2. The slit diameter of the circular die was 75 mm and the slit gap was 0.8 mm. The molten tubular three-layer film thus extruded was cooled while the film was guided over the outer surface of a cylindrical mandrel having an outer diameter of 76 mm as disposed just below the die and internally supplied with circulating cooling water at 20° C., with the exterior surface of the film being passed through a water bath, cooled down at room temperature and drawn to thereby give a tubular unstretched film with a diameter of about 75 mm and a thickness of 240 μm.

This unstretched film was guided to the tubular biaxial stretching device illustrated in FIG. 1, where the film was expanded and stretched. The voltage and current of the circular infrared heaters of the preheater 4 were adjusted to control the film temperature at the exit of the preheater. The eight circular infrared heaters of the main heater 5 were grouped in 4 sections and the voltage and current of each section were adjusted to heat the film. While an air stream was supplied along the outer surface of the tube from a downward direction of the main heater, a pressurized air was blown into the tubular film between low-speed nip rolls 2 and high-speed nip rolls 3. The pressure of the pressurized air and the relative peripheral speeds of the low-speed and high-speed nip rolls 2 and 3 were controlled so as to effect tubular stretching in a stretching ratio of 5.0 in the machine direction and in a stretching ratio of 4.0 in the transverse direction (an area stretching ratio: 20). Also, and air pressure (inner pressure of the tube) was adjusted so as to be a tensile strength of 70 kg/cm$^2$ by controlling the voltage and current of the circular infrared heaters of the preheater and the main heater, futher the air quantity and the air temperature of the cooling air ring 6.

The stability on stretching was excellent and there was no vertical motion at the stretching point and no sway on the stretched tube, and also there was not observed a non-uniform stretching state such as necking.

The obtained stretched film was excellent in transparency, stretchability, heat shrinkability, elastic restoration and heat sealability as shown in Table 2. Using this film, the packaging test was conducted by using the automatic packaging machine. The film was smoothly drawn out from the roll, it was not slipped off from the film clip, it was finely collapsed on tray-packaging, and the packaging was stably conducted. Also, the heat sealing by 90° C.-plate heater was smoothly conducted and the seal portion sufficiently adhered.

Further, the shrinkage in the tunnel part was excellent, and the configuration of finished package had no crease and no looseness and was fine. As to the restoration after packaging, the film was returned to the former state during 2 to 3 seconds without remaining the finger mark.

The raw material preparations, the stretching conditions, the stretched film characteristics and the results obtained in each test are shown together in Table 2.

EXAMPLES 10 TO 12

A stretchable, shrinkable laminated film was prepared in the same manner as in Example 9 except that resins forming into the intermediate layer and the innermost and outermost layers, the mixing ratio of the surfactant composition, the thickness percentage of each layer and the tensile strength on stretching were changed to values shown in Table 2.

The obtained films were estimated in the same manner as in Example 9. All of the films were excellent in transparency, stretchability, heat-shrinkability, elastic restoration and heat sealability. Also, the packaging suitability to automatic packaging machine was excellent, and the configuration of finished package was fine.

Also, the results and estimations in each test are shown together in Table 2, like the case of Example 9.

COMPARATIVE EXAMPLE 8

Using a composition of 90% by weight of a linear low density polyethylene indicating the melting curve after rapidly cooling wherein a main peak temperature (Tma) was 126° C., that is, Tma being outside the range of 118°±5° C., and a temperature difference between Tma and a main peak temperature in the melting curve after gradually cooling, Tmb, Tma-Tmb of 0° C., and 10% by weight of the low melting point polyethylene copolymer as the intermediate layer, as shown in Table 2, and the same composition as used in the inner and outer layers of Example 9 as the inner and outer layers, the extruding was conducted, and the film was rapidly cooled and drawn in the same manner as in Example 1 to give an unstretched laminated film with a diameter of about 75 mm and a thickness of 240 μm.

Then, in the same manner as in Example 9, the tubular unstretched film was fed to the tubular biaxial stretching device, where the film was expanded and stretched in a stretching ratio of 5.0 in the machine direction and in a stretching ratio of 4.0 in the transverse direction (area stretching ratio: 20), while controlling the tensile strength to low value such as 70 kg/cm$^2$.

However, the stability during stretching was poor, so that it was repeated that the stretched bubble greatly swayed and came into contact with the infrared heaters to blow out, thus the stretched film could not be obtained.

COMPARATIVE EXAMPLE 9

Using the same resins as used in Example 9 as the intermediate layer and the inner and outer layers, the film formation by the extrusion and the tubular biaxial stretching were conducted under the same conditions as in Example 9 except that the thickness of the intermediate layer accounted for 50% of the total thickness, as shown in Table 2. However, the stability on stretching was poor, the bubble was greatly swayed and the uniformly stretched film could not be continuously obtained.

COMPARATIVE EXAMPLES 10 AND 11

Using the same composition as used in Example 9 as the intermediate layer, a stretchable, shrinkable laminated film was prepared in the same manner as in Example 9 except that as to the inner and outer layers, a mixing percentage of the low melting point polyethylene copolymer was 10% by weight in Comparative Example 10 or a mixing percentage of the low melting point polyethylene copolymer was 70% by weight in Comparative Example 4.

In each Comparative Example 10 and 11, the stretching could be conducted without causing particular trouble in the stretching step. The obtained film in Comparative Example 10 was, however, poor in heat sealability at low temperature, and in the packaging test by the automatic packaging machine, the seal portion of the film at the tray bottom by the plate heater was unsatisfactory, so there remained portions where the seal parts easily peeled off. Also, though the film of Comparative Example 4 was excellent in heat-sealability at low temperature, in the packaging test by the automatic packaging machine, the releasability was poor when drawing out the film from the film roll, so the film was unsuitably drawn out at the film supplying part or the slipping property in the automatic packaging machine was bad and the packaging test could not smoothly conducted.

COMPARATIVE EXAMPLE 12

A strechable, shrinkable laminated film was prepared by using the same resin compositions as used in the inner and outer layers of Example 9 except that the surfactant composition was changed to a composition shown in Table 2 and by stretching at a tensile strength S of 200 kg/cm$^2$ on expansion and stretching, as shown in Table 2.

When the obtained film was elongated, the tensile stress at 50%-elongation was high and elongation was low. Accordingly, the packaging test was conducted by using the automatic packaging test with this film, the film was slipped off from the film clip of the bag-making part, that is, the stable packaging could not be continued. Also, on the tray packaging, troubles such as deformation of the tray were caused, so the configuration of finished package was unsatisfactory.

COMPARATIVE EXAMPLE 13

A shrinkable, stretchable laminated film was prepared in the same manner as in Example 9 except that the kinds and amounts of the surfactants added to the inner and outer layers were changed to 2.1 parts by weight, based on 100 parts by weight of the resin, of diglycerol oleate and 1.4 parts by weight of sorbitane trioleate.

Although the obtained stretchable, shrinkable film was excellent in antifogging property, slipping property in automatic packaging machine, film-collapsing property on tray packaging, the heat sealability by plate heater was bad and there was a defect that it was easy to cause a poor sealing of the film at the tray bottom.

INDUSTRIAL APPLICABILITY

Since the biaxially stretched polyethylene film of the present invention is prepared by using the linear low density polyethylene showing a specific heat behavior, even if stretching under the known stretching conditions, the film having a little variation in thickness, excellent suitability for packaging machine and printability can be obtained. Particularly, the films obtained by stretching the non-stretched film prepared from the composition wherein the low melting point polyethylene copolymer and the surfactants are admixed with the linear low density polyethylene, or the non-stretched film wherein the intermediate layer is prepared from mainly the specific linear low density polyethylene and the innermost and outermost layers are prepared from the composition wherein the specific low temperature ethylene-α-olefin copolymer and the specific surfactants were admixed with the polyethylene resin under the specific conditions such that the tensile strength S is $30 \leq S \leq 170$ kg/cm$^2$ to cause orientation to give the strechable, shrinkable polyethylene film which is excellent in transparency, stretchability, heat shrinkability, heat sealability and restoration after packaging, and is suitable for use in automatic packaging machine can be obtained.

TABLE 1

| | Ex. 4 | Ex. 5 | Com. Ex. 3 | Ex. 6 | Com. Ex. 4 | Com. Ex. 5 | Ex. 7 | Com. Ex. 6 | Ex. 8 | Com. Ex. 7 |
|---|---|---|---|---|---|---|---|---|---|---|
| (Resin A) Linear low density polyethylene | | | | | | | | | | |
| Density (g/cm$^3$) | 0.916 | 0.905 | 0.920 | 0.916 | 0.916 | 0.916 | 0.916 | 0.916 | 0.916 | 0.916 |
| Melt flow index (g/10 min.) | 1.2 | 1.5 | 2.0 | 1.2 | 1.2 | 1.2 | 1.2 | 1.2 | 1.2 | 1.2 |
| Comonomer | 4-Methyl pentene-1 Butene-1 | Butene-1 | 4-Methyl pentene-1 | 4-Methyl pentene-1 Butene-1 | 4-Methyl pentene-1 Butene-1 | 4-Methyl pentene-1 Butene-1 | 4-Methyl pentene-1 Butene-1 | 4-Methyl pentene-1 Butene-1 | 4-Methyl pentene-1 Butene-1 | 4-Methyl pentene-1 Butene-1 |
| Tma (°C.) | 119 | 113 | 126 | 119 | 119 | 119 | 119 | 119 | 119 | 119 |
| Tmb (°C.) | 124 | 117 | 126 | 124 | 124 | 124 | 124 | 124 | 124 | 124 |
| Tmb − Tma (°C.) | 5 | 4 | 0 | 5 | 5 | 5 | 5 | 5 | 5 | 5 |
| (Resin B) Low melting point polyethylene copolymer | | | | | | | | | | |
| Density (g/cm$^3$) | 0.88 | 0.88 | 0.88 | 0.88 | 0.88 | 0.88 | 0.88 | 0.88 | 0.88 | 0.88 |
| Melt flow index (g/10 min.) | 3.6 | 3.6 | 3.6 | 3.6 | 3.6 | 3.6 | 3.6 | 3.6 | 3.6 | 3.6 |
| Comonomer | Butene-1 | Butene-1 | Butene-1 | Butene-1 | Butene-1 | Butene-1 | Butene-1 | Butene-1 | Butene-1 | Butene-1 |
| Melting Point (°C.) | 74.1 | 74.1 | 74.1 | 74.1 | 74.1 | 74.1 | 74.1 | 74.1 | 74.1 | 74.1 |
| (A)/(B) weight ratio | 70/30 | 70/30 | 70/30 | 85/15 | 92/8 | 55/45 | 70/30 | 70/30 | 70/30 | 70/30 |
| Surfactant (part by weight/100 parts by weight of the resin) | | | | | | | | | | |
| Polyethylene glycol oleate | 0.25 | 0.25 | 0.25 | | | | | | 0.25 | 0.25 |
| Oleyl diethanol amine | 0.40 | 0.40 | 0.40 | | | | | | 0.40 | 0.40 |
| Sorbitane trioleate | 0.35 | 0.35 | 0.35 | 0.4 | 0.4 | 0.4 | 1.0 | 1.4 | 0.35 | 0.35 |
| Diglycerol oleate | | | | 0.6 | 0.6 | 0.6 | 1.5 | 2.1 | | |
| Total | 1.0 | 1.0 | 1.0 | 1.0 | 1.0 | 1.0 | 2.5 | 3.5 | 1.0 | 1.0 |
| Area stretching ratio | 20 | 20 | 20 | 20 | 20 | 20 | 20 | 20 | 20 | 20 |
| Tensile strength at stretching S (kg/cm$^2$) | 70 | 70 | 70 | 70 | 70 | 70 | 70 | 70 | 150 | 200 |
| Film thickness (μm) | 13 | 15 | 13 | 10 | 13 | 13 | 13 | 13 | 13 | 13 |
| Tensile stress at 50%-elongation (kg/cm$^2$) | 280/260 | 260/230 | — | 340/300 | 520/450 | 240/210 | 270/250 | 270/250 | 360/330 | 520/480 |
| Area shrinkage at 90° C. (%) | 36 | 42 | — | 23 | 18 | 44 | 38 | 39 | 46 | 17 |
| Elastic restoration after shrinking at 90° C. (%) | 93/93 | 92/92 | — | 94/93 | 88/87 | 87/85 | 93/93 | 92/92 | 94/94 | 83/85 |
| Figure of finished package | ○ | ○ | — | ○ | X | X | ○ | Δ | ○ | X |
| Heat-sealability (90° C.-plate heater) | ○ | ○ | — | ○ | X | ○ | ○ | X | ○ | X |
| Restoration after packaging | ○ | ○ | — | ○ | Δ | Δ | ○ | ○ | ○ | X |
| Antifogging property | ○ | ○ | — | ○ | Δ | ○ | ○ | ○ | ○ | ○ |
| Haze (%) | 0.8 | 0.7 | — | 0.9 | 1.2 | 0.9 | 0.7 | 0.7 | 0.8 | 1.1 |

TABLE (1)

| | Ex. 9 | Ex. 10 | Ex. 11 | Ex. 12 | Com. Ex. 8 | Com. Ex. 9 | Com. Ex. 10 | Com. Ex. 11 | Com. Ex. 12 | Com. Ex. 13 |
|---|---|---|---|---|---|---|---|---|---|---|
| Intermediate Layer | | | | | | | | | | |
| (Resin A) Lowered melting point polyethylene in rapidly cooling | | | | | | | | | | |
| Density (g/cm$^3$) | 0.916 | 0.916 | 0.900 | 0.916 | 0.920 | 0.916 | 0.916 | 0.916 | 0.916 | 0.916 |
| Melt flow index (g/10 min.) | 1.2 | 1.2 | 0.4 | 1.2 | 2.0 | 1.2 | 1.2 | 1.2 | 1.2 | 1.2 |
| Comonomer | 4-Methyl pentene-1 Butene-1 | 4-Methyl pentene-1 Butene-1 | Butene-1 | 4-Methyl pentene-1 Butene-1 | 4-Methyl pentene-1 | 4-Methyl pentene-1 | 4-Methyl pentene-1 | 4-Methyl pentene-1 | 4-Methyl pentene-1 | 4-Methyl pentene-1 |
| Tma (°C.) | 119 | 119 | 117 | 119 | 126 | 119 | 119 | 119 | 119 | 119 |
| Tmb (°C.) | 124 | 124 | 123 | 124 | 126 | 124 | 124 | 124 | 124 | 124 |
| (Resin B) Ethylene copolymer | | | | | | | | | | |
| Density (g/cm$^3$) | 0.88 | 0.88 | 0.88 | 0.89 | 0.88 | 0.88 | 0.88 | 0.88 | 0.88 | 0.88 |
| Melt flow index (g/10 min.) | 3.6 | 3.6 | 3.6 | 3.6 | 3.6 | 3.6 | 3.6 | 3.6 | 3.6 | 3.6 |
| Comonomer | Butene-1 | Butene-1 | Butene-1 | Butene-1 | Butene-1 | Butene-1 | Butene-1 | Butene-1 | Butene-1 | Butene-1 |
| Tm (°C.) | 74.1 | 74.1 | 74.1 | 83.8 | 74.1 | 74.1 | 74.1 | 74.1 | 74.1 | 74.1 |
| A/B (weight ratio) | 90/10 | 90/10 | 95/5 | 80/20 | 90/10 | 90/10 | 90/10 | 90/10 | 90/10 | 90/10 |
| Predetermined thickness percentage (%) | 80 | 60 | 70 | 70 | 80 | 50 | 80 | 80 | 80 | 80 |
| The innerest and outerest layers | | | | | | | | | | |
| (Resin A) Linear low density polyethylene | | | | | | | | | | |
| Density (g/cm$^3$) | 0.916 | 0.916 | 0.900 | 0.916 | 0.916 | 0.916 | 0.916 | 0.916 | 0.916 | 0.916 |
| Melt flow index (g/10 min.) | 1.2 | 1.2 | 0.4 | 1.2 | 1.2 | 1.2 | 1.2 | 1.2 | 1.2 | 1.2 |
| Comonomer | 4-Methyl pentene-1 Butene-1 | 4-Methyl pentene-1 Butene-1 | Butene-1 | 4-Methyl pentene-1 Butene-1 | 4-Methyl pentene-1 Butene-1 | 4-Methyl pentene-1 Butene-1 | 4-Methyl pentene-1 Butene-1 | 4-Methyl pentene-1 Butene-1 | 4-Methyl pentene-1 Butene-1 | 4-Methyl pentene-1 Butene-1 |
| Tma (°C.) | 119 | 119 | 117 | 119 | 119 | 119 | 119 | 119 | 119 | 119 |
| Tmb (°C.) | 124 | 124 | 123 | 124 | 124 | 124 | 124 | 124 | 124 | 124 |
| (Resin B) Low melting point polyethylene copolymer | | | | | | | | | | |

TABLE (1)-continued

|  | Ex. 9 | Ex. 10 | Ex. 11 | Ex. 12 | Com. Ex. 8 | Com. Ex. 9 | Com. Ex. 10 | Com. Ex. 11 | Com. Ex. 12 | Com. Ex. 13 |
|---|---|---|---|---|---|---|---|---|---|---|
| Density (g/cm$^3$) | 0.88 | 0.88 | 0.88 | 0.89 | 0.88 | 0.88 | 0.88 | 0.88 | 0.88 | 0.88 |
| Melt flow index (g/10 min.) | 3.6 | 3.6 | 3.6 | 3.6 | 3.6 | 3.6 | 3.6 | 3.6 | 3.6 | 3.6 |
| Comonomer | Butene-1 | Butene-1 | Butene-1 | Butene-1 | Butene-1 | Butene-1 | Butene-1 | Butene-1 | Butene-1 | Butene-1 |
| Tm (°C.) | 74.1 | 74.1 | 74.1 | 83.8 | 74.1 | 74.1 | 74.1 | 74.1 | 74.1 | 74.1 |
| A/B (weight ratio) | 50/50 | 60/40 | 80/20 | 60/40 | 50/50 | 50/50 | 90/10 | 30/70 | 50/50 | 50/50 |

TABLE (2)

|  | Ex. 9 | Ex. 10 | Ex. 11 | Ex. 12 | Com. Ex. 8 | Com. Ex. 9 | Com. Ex. 10 | Com. Ex. 11 | Com. Ex. 12 | Com. Ex. 13 |
|---|---|---|---|---|---|---|---|---|---|---|
| The innerest and the outerest layers | | | | | | | | | | |
| Surfactant (part by weight/100 parts by weight of resin) | | | | | | | | | | |
| Polyethylene glycol oleate | 0.25 | 0.25 | 0.25 | 0.25 | 0.25 | 0.25 | 0.25 | 0.25 | | |
| Oleyl diethanol amine | 0.40 | 0.40 | 0.40 | 0.40 | 0.40 | 0.40 | 0.40 | 0.40 | | |
| Sorbitane trioleate | 0.35 | 0.35 | 0.35 | 1.00 | 0.35 | 0.35 | 0.35 | 0.35 | 0.40 | 1.40 |
| Diglycerol oleate | | | | 1.50 | | | | | 0.60 | 2.10 |
| Total | 1.00 | 1.00 | 1.00 | 2.50 | 1.00 | 1.00 | 1.00 | 1.00 | 1.00 | 3.50 |
| Predetermined thickness percentage (inner) (%) | 10 | 20 | 15 | 15 | 10 | 25 | 10 | 10 | 10 | 10 |
| Predetermined thickness percentage (outer) (%) | 10 | 20 | 15 | 15 | 10 | 25 | 10 | 10 | 10 | 10 |
| Area stretching ratio | 20 | 20 | 20 | 20 | 20 | 20 | 20 | 20 | 20 | 20 |
| Tensile strength at stretching S (kg/cm$^2$) | 70 | 70 | 70 | 150 | 70 | 70 | 70 | 70 | 200 | 70 |
| Stretchable and shrinkable multi-layer film | | | | | | | | | | |
| Thickness (μm): | | | | | | | | | | |
| Intermediate layer | 10.5 | 7.8 | 9.1 | 9.2 | 10.5 | 6.5 | 10.6 | 10.5 | 10.6 | 10.4 |
| Inner layer | 1.3 | 2.6 | 2.0 | 2.0 | 1.3 | 3.3 | 1.3 | 1.3 | 1.3 | 1.3 |
| Outer layer | 1.3 | 2.6 | 1.9 | 2.0 | 1.3 | 3.2 | 1.3 | 1.3 | 1.3 | 1.3 |
| All layers | 13.1 | 13.0 | 13.0 | 13.2 | 13.1 | 13.0 | 13.2 | 13.1 | 13.2 | 13.0 |
| Haze (%) | 0.8 | 0.9 | 0.7 | 0.7 | — | — | 1.0 | 0.8 | 0.7 | 0.6 |
| Tensile stress at 50%-elongation (kg/cm$^2$) | 320/270 | 340/290 | 420/390 | 460/420 | — | — | 390/330 | 350/300 | 550/510 | 330/280 |
| Area shrinkage at 90° C. (%) | 34 | 38 | 25 | 46 | — | — | 27 | 38 | 43 | 35 |
| Elastic restoration after shrinking at 90° C. (%) | 91/90 | 90/90 | 91/91 | 92/90 | — | — | 90/90 | 92/90 | 83/82 | 91/90 |
| Figure of finished package | ○ | ○ | ○ | ○ | — | — | Δ | X | X | Δ |
| Heat-sealability (90° C.-plate heater) | ○ | ○ | ○ | ○ | — | — | X | — | X | X |
| Restoration after packaging | ○ | ○ | ○ | ○ | — | — | ○ | — | X | ○ |
| Antifogging property | ○ | ○ | ○ | ○ | — | — | ○ | ○ | Δ | ○ |

We claim:

1. A biaxially stretched polyethylene film comprising a main component of linear low density polyethylene (A) having a density of 0.870 to 0.930 g/cm$^3$ and a melt flow index of 0.1 to 10 g/10 minutes, and showing, in measurement of a melting point by a differential scanning calorimeter a main peak temperature (Tma) within the range of 118±5° C. in a melting curve obtained when after a temperature of the polyethylene is kept at 190° C. for 30 minutes, the temperature is dropped down to 20° C. at a cooling rate of 100° C./minute and subsequently raised at a heating rate of 10° C./minute, and showing a temperature difference between Tma and Tmb of at least 3° C. wherein Tmb is a main peak temperature in a melting curve obtained when after the temperature of the polyethylene is kept at 190° C. for 30 minutes, the temperature is dropped down to 20° C. at a cooling rate of 10° C./minute and subsequently raised at a heating rate of 10° C./minute.

2. A biaxially stretched polyethylene film which is formed from a composition comprising, as main components:

100 parts by weight of the sum of 90 to 60% by weight of a linear low density polyethylene (A) and 10 to 40% by weight of an ethylene-α-olefin copolymer (B) and 0.5 to 3.0 parts by weight of a surfactant composition (D) wherein:

said linear low density polyethylene (A) has a density of 0.870 to 0.930 g/cm$^3$ and a melt flow index of 0.1 to 10 g/10 minutes, and shows, in measurement of a melting point by a differential scanning calorimeter, a main peak temperature (Tma) within the range of 118±5° C. in a melting curve obtained when after a temperature of the polyethylene is kept at 190° C. for 30 minutes, the temperature is dropped down to 20° C. at a cooling rate of 100° C./minute and subsequently raised at a heating rate of 10° C./minute, and shows a temperature difference between Tma and Tmb of at least 3° C. wherein Tmb is a main peak temperature in a melting curve obtained when after the temperature of the polyethylene is kept at 190° C. for 30 minutes, the temperature is dropped down to 20° C. at a cooling rate of 10° C./minute and subsequently raised at a heating rate of 10° C./minute;

said ethylene-α-olefin copolymer (B) has a density of 0.870 to 0.900 g/cm$^3$, a melt index of 0.1 to 20 g/10 minutes and a melting point according to DSC of 50° to 100° C.; and said surfactant composition (D) comprises at least one surfactant selected from the group consisting of glycerol fatty acid esters, polyglycerol fatty acid esters, sorbitan fatty acid esters, polyethylene glycol fatty acid esters, alkyl diethanol amides, polyoxyethylene alkyl amines and polyoxethylene alkyl ethers.

3. A biaxially stretched polyethylene film which comprises:

an intermediate layer formed from a composition comprising, as a main component, a linear low density polyethylene (A) and an innermost layer and an outermost layer formed from a composition comprising, as main components, 100 parts by weight of the sum of 20 to 60% by weight of an ethylene-α-olefin copolymer (B) and 80 to 40% by weight of a linear low density polyethylene (C) and 0.5 to 3.0 parts by weight of a surfactant composition (D);

the thickness of the intermediate layer accounting for 60% of all layers and the thickness of the innermost layer and the outermost layer being at least 1 μm, respectively wherein:

said linear low density polyethylene (A) has a density of 0.870 to 0.930 g/cm$^3$ and a melt flow index of 0.1 to 10 g/10 minutes, and shows, in measurement of a melting point by a differential scanning calorimeter, a main peak temperature (Tma) within the range of 118°±5° C. in a melting curve obtained when after a temperature of the polyethylene is kept at 190° C. for 30 minutes, the temperature is dropped down to 20° C. at a cooling rate of 100° C./minute and subsequently raised at a heating rate of 10° C./minute and shows a temperature difference between Tma and Tmb of at least 3° C. wherein Tmb is a main peak temperature in a melting curve obtained when after the temperature of the polyethylene is kept at 190° C. for 30 minutes, the temperature is dropped down to 20° C. at a cooling rate of 10° C./minute and subsequently raised at a heating rate of 10° C./minute;

said ethylene-o-olefin copolymer (B) has a density of 0.870 to 0.900 g/cm$^3$, a melt index of 0.1 to 20 g/10 minutes and a melting point according to DSC of 50° to 100° C.;

said linear low density polyethylene (C) has a density of 0.890 to 0.930 g/cm$^3$ and a melt flow index of 0.1 to 10 g/10 minutes; and said surfactant composition (D) comprises at least one surfactant selected from the group consisting of glycerol fatty acid esters, polyglycerol fatty acid esters, sorbitan fatty acid esters, polyethylene glycol fatty acid esters, alkyl diethanol amides, polyoxyethylene alkyl amines and polyoxethylene alkyl ethers.

4. A biaxially stretched polyethylene film according to claim 2 or 3 wherein said surfactant composition comprises at least one surfactant selected from the group consisting of polyglycerol fatty acid esters, sorbitan fatty acid esters, polyethylene glycol fatty acid esters and alkyl ethanol amines.

5. A biaxially stretched polyethylene film according to claim 1, 2 or 3 wherein the endothermic area within the range of Tma ±5° C. is at least 15% of the total endothermic area.

6. A biaxially stretched polyethylene film according to claim 1, 2 or 3 having a thickness variation of less than 8%.

7. A biaxially stretched polyethylene film according to claim 1, 2 or 3 having an area shrinkage of at least 20% at 90° C.

8. A biaxially stretched polyethylene film according to claim 2 or 3 having a tensile stress at 50%-elongation of not more than 500 kg/cm$^2$.

9. A biaxially stretched polyethylene film according to claim 2 or 3 having an elastic restoration after 1 minute from 30%-elongation in a machine direction and a transverse direction of the film heat-shrinked in an area of 15% at 90° C. of at least 90% respectively.

10. A process for preparing a biaxially stretched polyethylene film of a composition comprising, as main components, 100 parts by weight of the sum of 90 to 60% by weight of a linear low density polyethylene (A) and 10 to 40% weight of a ethylene-α-olefin copolymer (B), and 0.5 to 3.0 parts by weight of surfactant composition (D); the process comprising melt-extruding and solidifying the composition by rapidly cooling to produce a non-stretched film, and stretching the non-stretched film in a temperature region where an orientation can be induced by stretching under conditions such that a tensile strength represented by formula (1) is 30≦S≦170 kg/cm$^2$ Formula (1): $S = \dfrac{pd}{2t}$ wherein p is an internal pressure of a bubble (kg/cm$^2$), d is an inside diameter of a bubble (cm) and t is a film thickness (cm); and wherein:

said linear low density polyethylene (A) has a density of 0.870 to 0.930 g/cm$^3$ and a melt flow index of 0.1 to 10 g/10 minutes, and shows, in measurement of a melting point by a differential scanning calorimeter, a main peak temperature (Tma) within the range of 118°±5° C. in a melting curve obtained when after a temperature of the polyethylene is kept at 190° C. for 30 minutes, the temperature is dropped down to 20° C. at a cooling rate of 100° C./minute and subsequently raised at a heating rate of 10° C./minute, and shows a temperature difference between Tma and Tmb of at least 3° C. wherein Tmb is a main peak temperature in a melting curve obtained when after the temperature of the polyethylene is kept at 190° C. for 30 minutes, the temperature is dropped down to 20° C. at a cooling rate of 10° C./minute and subsequently raised at a heating rate of 10° C./minute;

said ethylene-α-olefin copolymer (B) has a density of 0.870 to 0.900 g/cm$^3$, a melt index of 0.1 to 20 g/10 minutes and a melting point according to DSC of 50° to 100° C.; and said surfactant composition (D) comprises at least one surfactant selected from the group consisting of glycerol fatty acid esters, polyglycerol fatty acid esters, sorbitan fatty acid esters, polyethylene glycol fatty acid esters, alkyl diethanol amides, polyoxyethylene alkyl amines and polyoxethylene alkyl ethers.

11. A process for preparing a biaxially stretched polyethylene film of a composition comprising, as a main component, a linear low density polyethylene (A) which is to be formed into an intermediate layer and a composition comprising, as main components, 100 parts by weight of the sum of 20 to 60% by weight of a ethylene-α-olefin copolymer (B) and 80 to 40% by weight of a linear low density polyethylene (C) and 0.5 to 3.0 parts by weight of a surfactant composition (D); the process comprising melt-coextruding and solidifying the composition by rapid cooling to produce a non-stretched film having a thickness of the intermediate layer of at least 60% of all of the layers and a thickness after stretching of an innermost layer and an outermost layer are at least 1 μm, respectively, and stretching the non-stretched film in a temperature region where an orientation can be induced by stretching under conditions such that a tensile strength represented by formula (1) is $30 \leq S \leq 170$ kg/cm²:

Formula (1): $S = \dfrac{pd}{2t}$ wherein p is an internal pressure of a bubble (kg/cm²), d is an inside diameter of a bubble (cm) and t is a film thickness (cm); and wherein:

said linear low density polyethylene (A) has a density of 0.870 to 0.930 g/cm³ and a melt flow index of 0.1 to 10 g/10 minutes, and shows, in measurement of a melting point by a differential scanning calorimeter, a main peak temperature (Tma) within the range of 118°±5° C. in a melting curve obtained when after a temperature of the polyethylene is kept at 190° C. for 30 minutes, the temperature is dropped down to 20° C. at a cooling rate of 100° C./minute and, subsequently raised at a heating rate of 10° C./minute, and shows a temperature difference between Tma and Tmb of at least 3° C. wherein Tmb is a main peak temperature in a melting curve obtained when after the temperature of the polyethylene is kept at 190° C. for 30 minutes, the temperature is dropped down to 20° C. at a cooling rate of 10° C./minute and subsequently raised at a heating rate of 10° C./minute;

said ethylene-α-olefin copolymer (B) has a density of 0.870 to 0.900 g/cm³, a melt index of 0.1 to 20 g/10 minutes and a melting point according to DSC of 50° to 100° C.;

said linear low density polyethylene (C) has a density of 0.890 to 0.930 g/cm³ and a melt flow index of 0.1 to 10 g/10 minutes; and said surfactant composition (D) comprises at least one surfactant selected from the group consisting of glycerol fatty acid esters, polyglycerol fatty acid esters, sorbitan fatty acid esters, polyethylene glycol fatty acid esters, alkyl diethanol amides, polyoxyethylene alkyl amines and polyoxyethylene alkyl ethers.

* * * * *